(12) United States Patent
Leipold et al.

(10) Patent No.: US 8,490,661 B1
(45) Date of Patent: Jul. 23, 2013

(54) FUEL TANK FILLER NECK

(75) Inventors: Stefan O. Leipold, Seltz (FR); Tobias Schanegg, Langensteinbach (DE); Ankur Seth, Noida (IN)

(73) Assignee: TI Automotive Technology Center GmbH, Rastatt (DE)

( * ) Notice: Subject to any disclaimer, the term of this patent is extended or adjusted under 35 U.S.C. 154(b) by 0 days.

(21) Appl. No.: 13/419,122

(22) Filed: Mar. 13, 2012

(51) Int. Cl.
*B65B 1/04* (2006.01)
*B65B 3/00* (2006.01)

(52) U.S. Cl.
USPC .......................... 141/312; 141/350; 220/86.2

(58) Field of Classification Search
USPC ................. 141/312, 350; 220/86.2; 137/587, 137/588
See application file for complete search history.

(56) References Cited

U.S. PATENT DOCUMENTS

| | | | |
|---|---|---|---|
| 4,898,395 A * | 2/1990 | Kawase | 277/615 |
| 5,660,206 A | 8/1997 | Neal et al. | |
| 5,947,153 A | 9/1999 | Bucci et al. | |
| 6,446,826 B1 * | 9/2002 | Foltz et al. | 220/86.2 |
| 7,082,973 B2 * | 8/2006 | Ganachaud et al. | 141/350 |
| 7,096,899 B2 * | 8/2006 | Vetter et al. | 141/350 |
| 7,415,997 B2 * | 8/2008 | Cisternino et al. | 141/368 |
| 7,640,954 B2 * | 1/2010 | Bar | 141/350 |
| 7,779,820 B2 | 8/2010 | Rittershofer | |
| 8,251,109 B2 * | 8/2012 | Gebert et al. | 141/286 |
| 2010/0006178 A1 * | 1/2010 | Muth et al. | 141/350 |
| 2010/0193075 A1 * | 8/2010 | Gebert et al. | 141/311 R |
| 2011/0139779 A1 * | 6/2011 | Muller | 220/86.2 |
| 2011/0162754 A1 * | 7/2011 | Murabayashi et al. | 141/286 |

* cited by examiner

*Primary Examiner* — Timothy L Maust
*Assistant Examiner* — Brandon J Warner
(74) *Attorney, Agent, or Firm* — Reising Ethington P.C.

(57) ABSTRACT

In at least one implementation, a filler neck for a fuel tank may include an outer tube attached to the fuel tank through which fuel is discharged into the fuel tank during a refueling event, and an insert. The insert may be carried by the outer tube and have a passage adapted to receive a refueling nozzle during a refueling event, a first barrier adapted to engage a refueling nozzle inserted in the passage and having one or more gaps through which fluid may flow between the refueling nozzle and first barrier, and a second barrier adapted to engage the first barrier to reduce the size of the gaps when the first barrier is engaged with a refueling nozzle.

19 Claims, 3 Drawing Sheets

FUEL TANK FILLER NECK

TECHNICAL FIELD

The present disclosure relates generally to a filler neck for a fuel tank.

BACKGROUND

Fuel tanks for vehicles may include a filler neck through which fuel is discharged into the fuel tank during a tank refilling event. The filler pipe may be open at one end to receive a refueling nozzle therein, and have a conduit downstream of the open end and leading to the fuel tank.

SUMMARY

In at least one implementation, a filler neck for a fuel tank may include an outer tube attached to the fuel tank through which fuel is discharged into the fuel tank during a refueling event, and an insert. The insert may be carried by the outer tube and have a passage adapted to receive a refueling nozzle during a refueling event, a first barrier adapted to engage a refueling nozzle inserted in the passage and having one or more gaps through which fluid may flow between the refueling nozzle and first barrier, and a second barrier adapted to engage the first barrier to reduce the size of the gaps when the first barrier is engaged with a refueling nozzle.

An insert for a filler neck may include a main body having an outer wall, an entrance portion and inner and outer sets of fingers. The entrance portion defines at least part of a passage into which a refueling nozzle is inserted into the insert. The inner set of fingers may be carried by the main body, have a slot between adjacent fingers in the inner set of fingers and collectively defining part of the passage into which a refueling nozzle is inserted during a refueling event. The passage has a minimum diameter defined between the fingers of the inner set of fingers that is equal to or less than the outer diameter of a refueling nozzle. And the outer set of fingers may be carried by the main body and located radially outwardly of the inner set of fingers with an outer finger radially aligned with each slot between adjacent fingers of the inner set of fingers. Upon insertion of a refueling nozzle into the passage the refueling nozzle engages the inner set of fingers and outwardly displaces at least a portion of the fingers into engagement with the outer set of fingers.

BRIEF DESCRIPTION OF THE DRAWINGS

The following detailed description of exemplary embodiments and best mode will be set forth with reference to the accompanying drawings, in which.

DETAILED DESCRIPTION OF PRESENTLY PREFERRED EMBODIMENTS

Figure 1:
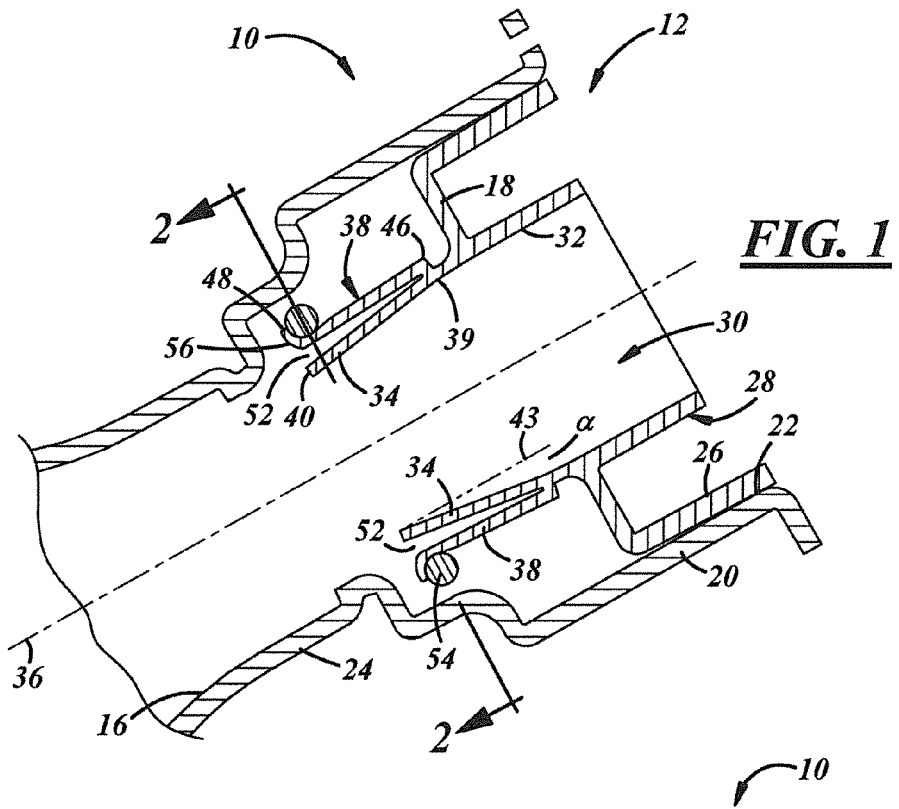
FIG. 1 is a fragmentary cross sectional view of a portion of a filler neck with an insert.
Figure 2:
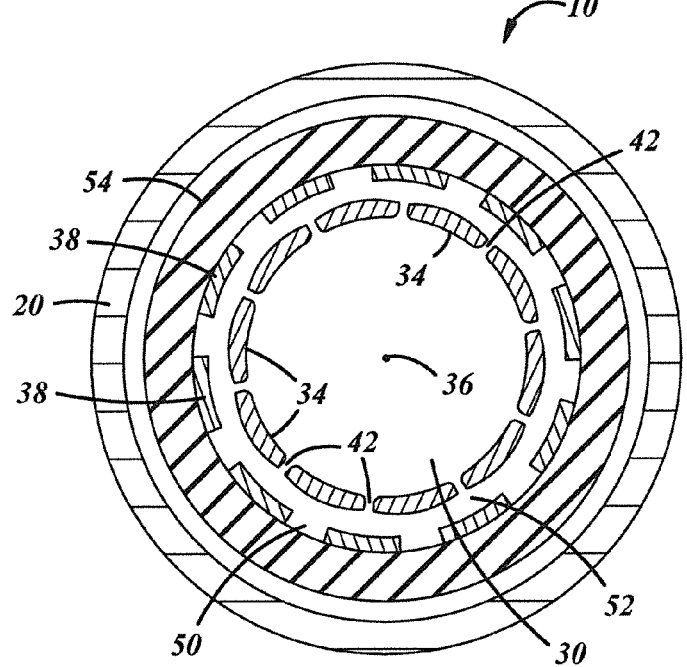
FIG. 2 is a cross sectional view taken generally along line 2-2 in FIG. 1.

Referring in more details to the drawings, FIGS. 1 and 2 illustrate a portion of a filler neck 10 that may be coupled to a fuel tank. The filler neck 10 may have an inlet end 12 through which a refueling nozzle 14 (FIGS. 3 and 4) may be inserted and may define a passage 16 or conduit through which fuel discharged from the refueling nozzle 14 is directed into the fuel tank. The filler neck 10 may have certain features adapted to interact with a refueling nozzle 14, and these features may be provided in an insert 18 disposed at least partially within the inlet end 12 of the filler neck 10.

The filler neck 10 may include an outer tube 20 and the insert 18. The outer tube 20 may define an opening 22 at the inlet end 12, and the inlet end 12 may be defined in an enlarged area of the tube 20 that has a larger inner diameter than a downstream portion 24 of the tube 20. The tube 20 may be adapted to receive a cap or valve to close the opening 22 at times other than when fuel is being added to the fuel tank. The portion of the tube 20 downstream of the inlet end defines a passage through which fuel is added to the fuel tank. The outer tube 20 may be formed from metal and/or plastic materials.

The insert 18 is received within the inlet end 12 of the outer tube 20 and may be fixed therein by welding, an adhesive, a press-fit or friction fit, or by any other suitable means or mechanism. The insert 18 includes an outer wall 26 adapted for a close fit within the inlet end of the outer tube 20, and an inner wall 28 that defines part of a passage 30 into which a refueling nozzle 14 is inserted during a refueling event. The inner wall 28 may be defined in part by an entrance portion 32 in which a refueling nozzle 14 is initially received and a plurality of circumferentially spaced and axially extending fingers 34, where the terms circumferential and axial relate to a center axis 36 of the passage 30. The fingers may be provided in two sets, including an inner set 34 and an outer set 38 located radially outwardly from the inner set. The inner and outer sets of fingers 34, 38 each may include two or more fingers and each set may each define an annular array of fingers, and the arrays be generally coaxially aligned, if desired.

As best shown in FIG. 1, each finger 34 in the inner set of fingers may extend from a first end 39 adjacent to the entrance portion 32 of the inner wall 28, to a free end 40. In the example shown, the entrance portion 32 is solid, without any voids or slot formed therein, while the fingers 34 are defined by axially extending slots 42 (FIGS. 2 and 5) located between adjacent fingers. Of course, the entrance portion 32 could have one or more voids formed therein, if desired. So that the fingers 34 may flex outwardly to accommodate refueling nozzles 14 of different sizes and return toward their unflexed position after a refueling nozzle is removed from the filler neck 10, the fingers 34 may be formed of a relatively flexible and resilient material, such as various plastics or metals. The fingers 34 of the inner set may be angled inwardly at an acute included angle relative to an imaginary line 43 parallel to the axis 36, and collectively define a minimum inner diameter that is smaller than the inner diameter of the entrance portion 32 of the inner wall 28. The minimum inner diameter defined by the inner set of fingers 34 may be less than the outer diameter of one or more refueling nozzles 14 that may be used with the filler neck 10 so that the free ends 40 of the fingers 34 are flexed outwardly when a refueling nozzle 14 is inserted through the passage 30. In this way, the fingers 34 engage an outer surface 44 of the refueling nozzle 14, and the refueling nozzle may be centered between the fingers. While shown as generally straight or linear, the inner fingers 34 may be curved or otherwise contoured (e.g. the thickness of the fingers may change over their axial length), and the minimum diameter could be formed at a location spaced from the free ends 40 of the fingers 34.

Figure 4:
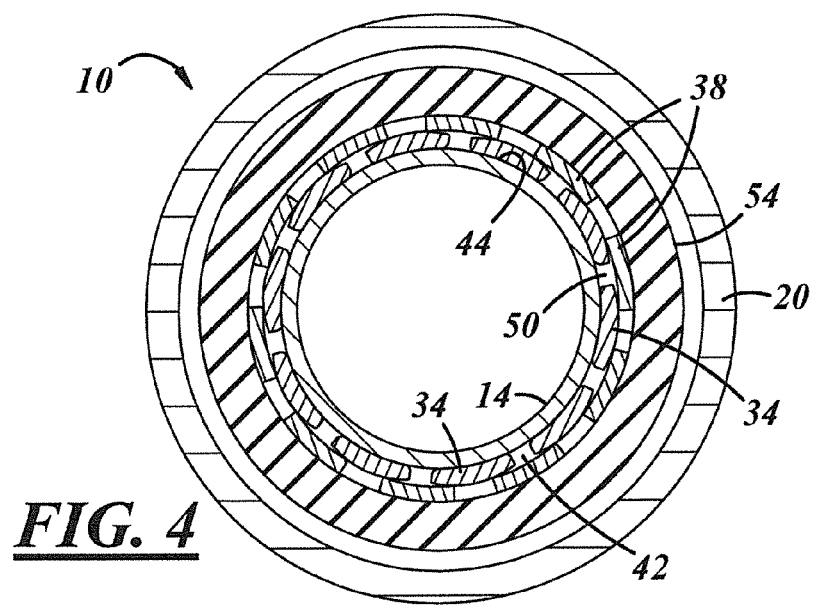
FIG. 4 a cross sectional view taken generally along line 4-4 in FIG. 3.
Figure 5:
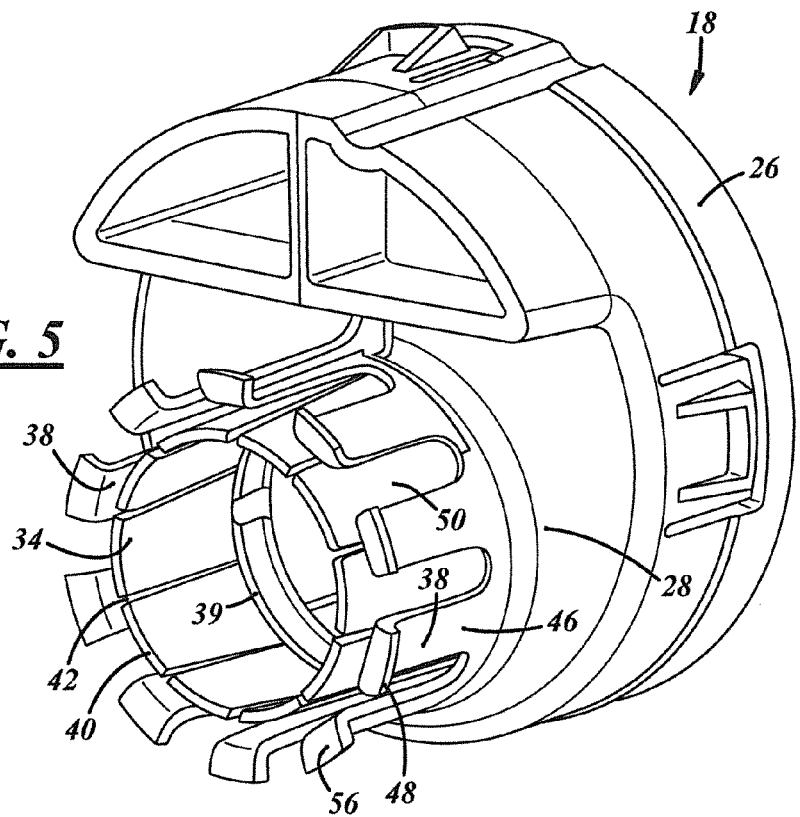
FIG. 5 is a perspective view of the filler neck insert.

The outer set of fingers 38 may extend from a first end 46 (FIGS. 1 and 5) adjacent to the entrance portion 32 to a second, free end 48 generally adjacent to the free ends 40 of the fingers 34 in the inner set. The first ends 46 of the outer fingers 38 may be connected to the first ends of the inner fingers 34, the entrance portion 32 of the inner wall 28 or both. Of course, the outer fingers 38 may be independent of the inner fingers 34 or otherwise carried by the insert 18. The outer fingers 38 may also be defined by slots 50 provided between adjacent fingers 38 and they may be made of the same material as the inner fingers 34. In the implementation shown, the insert 18 may be formed from one unitary piece of material, with the inner and outer fingers 34, 38 formed on the same body or piece of material. The outer set of fingers 38 may surround the inner set of fingers 34, with a radial gap 52 provided between them. The gap 52 may be wedge shaped in cross-section and larger adjacent to the free ends 40, 48 of the fingers 34, 38 to permit the free ends to flex or be displaced more relative to each other. The outer fingers 38 may be circumferentially offset from the inner fingers 34 so that an outer finger 38 is disposed radially outwardly from a slot 42 between adjacent inner fingers 34. In this way, as shown in FIGS. 2, 4 and 5, each outer finger 38 radially overlies or overlaps a portion of two inner fingers 34 and the slot 42 between them.

A biasing member 54 (FIGS. 1 and 3) may be provided to yieldably bias the outer fingers 38 radially inwardly, and/or yieldably resist outward flexing of the outer fingers 38. In the implementation shown, the biasing member 54 includes a flexible and resilient annular spring or band 54 disposed outboard of the outer fingers 38, generally adjacent to the free ends 48. To retain the band 54 adjacent to the outer fingers 38, the free end of each finger 38 may have a radially outwardly flared curl or hook 56. Of course, other retaining features or components can be provided for the band 54, and the biasing member may have a form other than an annular band. The biasing member 54 may be made from any suitable material such as various metals and/or plastics. Further, the resistance of the outer fingers 38 to bending may provide a force sufficient to hold the outer fingers 38 against the inner fingers 34 without any biasing member 54. The outer fingers 54 could be contoured (e.g. bent) or angled to improve the contact between the inner and outer fingers 34, 38 in use with a range of refueling nozzle sizes.

Figure 3:
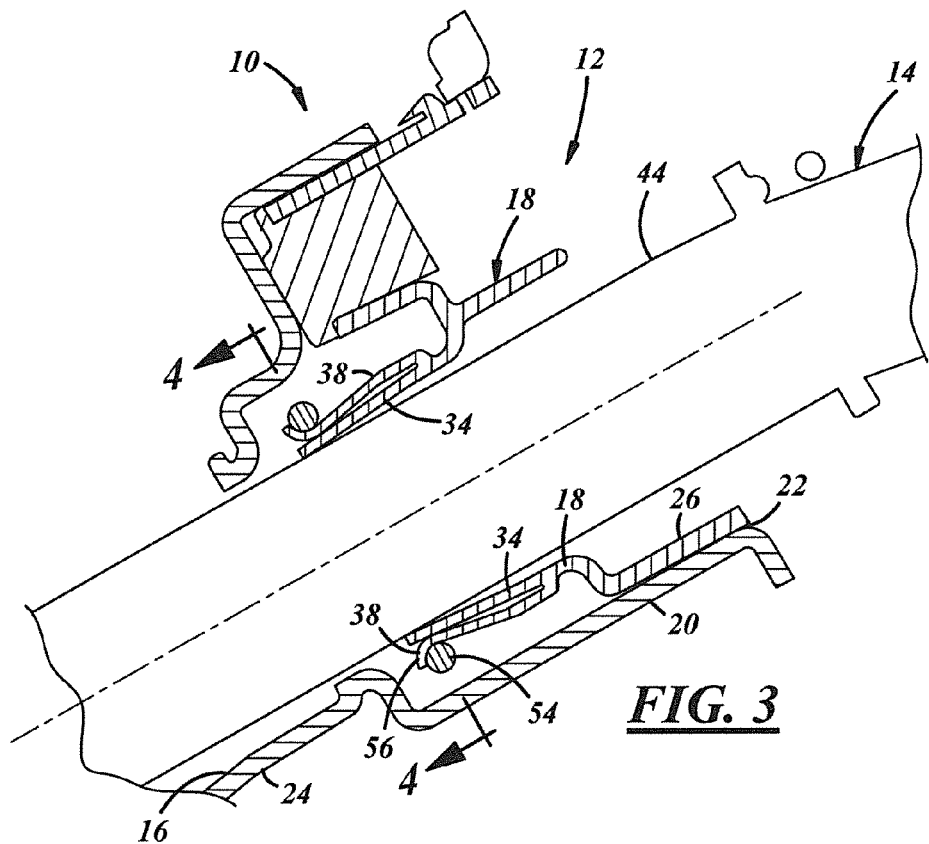
FIG. 3 is a cross sectional view of the filler neck showing a refueling nozzle inserted therein.
Figure 6:
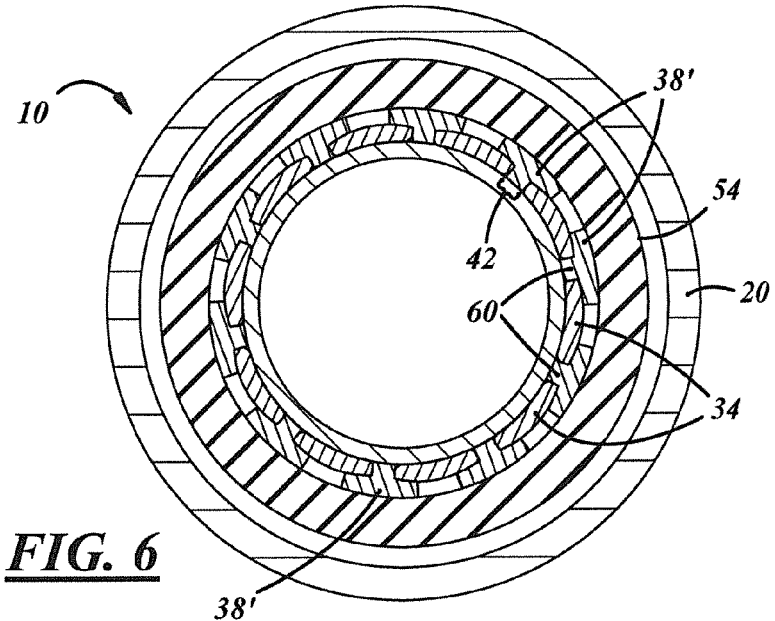
FIG. 6 is a cross sectional view similar to FIG. 4 illustrating a refueling nozzle received in the filler neck.

The inner diameter of the band 54 minus the radial thickness of both the first and second fingers 34, 38 may be equal to or smaller than an outer diameter of a refueling nozzle 14 that may be inserted into the filler neck 10. When a refueling nozzle 14 is inserted into the filler neck 10 and slid through the passage 30 defined by the inner fingers 34, as shown in FIGS. 3 and 4, the refueling nozzle 14 engages the inner fingers 34, and the inner fingers 34 are flexed outwardly into engagement with the outer fingers 38. In this way, a seal may be provided around the refueling nozzle 14, with each inner finger 34 engaging the outer surface 44 of the refueling nozzle 14 and defining a first barrier and each outer finger 38 engaging the adjacent inner fingers 34 and covering or overlying each slot 42 between adjacent inner fingers 34 to define a second barrier, as best shown in FIG. 4. In this way, the first barrier may include one or more gaps 42 or flow areas between adjacent fingers 34 and the second barrier reduces the size of the gaps or flow areas in the first barrier (where reducing the size of the gaps includes eliminating the gaps). This restricts fluid flow between the refueling nozzle 14 and first barrier as compared to use of only the first barrier by itself. The biasing member 54 may hold the outer fingers 38 against the inner fingers 34 to maintain the sets of fingers in contact with each other, and may also provide a force holding the inner fingers 34 against the refueling nozzle 14. Even when the inner fingers 34 are outwardly flexed, the circumferential flow area of each slot 42 between adjacent inner fingers 34 may, in at least certain implementations, be small enough to prevent an explosion or flame propagation for a class IIA combustible mixture, which generally relates to a gap of 0.5 mm in width or less. In general, in at least some implementations, the maximum gap may be 0.7 mm or less, and preferably (although not necessarily) less than or equal to 0.5 mm, with a smaller gap preferred for the lower potential of flame propagation provided by a smaller gap. In at least some implementations, gaps greater than 0.5 mm may be provided in areas where the gap is sufficient long, for example (without limitation) greater than 10 mm in length. Of course, other dimensions may be used and the permissible dimensions may vary for gaps depending on their shape and/or location, and regardless of their length. As shown in FIG. 6, the size of any gap could be reduced, if desired, by providing a projection 60 on the radially inner surface of outer fingers 38' that is aligned with the slot 42 between its adjacent inner fingers 34, and received within that slot 42 when the inner fingers 34 are outwardly flexed by a refueling nozzle 14.

The relatively small size of the gaps, if any gaps remain, may ensure that any fire upstream of the fingers 34, 38 does not pass downstream of the fingers toward the fuel tank, and may also ensure that any fire downstream of the fingers 34, 38 does not pass upstream of the fingers and out of the filler neck 10. The small gaps may also reduce or prevent the discharge of fuel out of the filler neck 10 during refueling. Further, venting of fuel vapors to the atmosphere through the filler neck 10 during refueling can also be reduced or effectively prevented. Different diameter refueling nozzles 14 may be accommodated by the flexible fingers 34, 38 while still maintaining the desired relatively small gaps or substantially no gap as described above. The relatively small gaps can be achieved with a molded plastic part without the need for discrete seals, such as a brush seal, rubber seal or other material in between the insert 18 and refueling nozzle 14, although, of course, such seals or other materials could be used in combination with the fingers, if desired. Further, the insert 18 could be formed from electrostatic conductive material so that separate electrical grounding of the insert 18 may not be needed, and the insert may be more robust when formed from a single piece of material, which may also facilitate assembly of the filler neck 10.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A filler neck for a fuel tank, comprising:
an outer tube attached to the fuel tank through which fuel is discharged into the fuel tank during a refueling event; and
an insert carried by the outer tube and having a passage adapted to receive a refueling nozzle during a refueling event, a first barrier having an inner set of a plurality of generally axially extending and resilient fingers with an elongate slot between the fingers of the inner set of fingers with the inner set of fingers constructed to engage a refueling nozzle inserted in the passage and having one or more gaps through which fluid may flow between the refueling nozzle and first barrier, and a second barrier having an outer set of a plurality of generally axially extending and flexible fingers overlapping at least a portion of the slots between the fingers of the inner set of fingers and a portion of the two fingers next to each slot and constructed to engage the inner set of fingers at least upon insertion of a refueling nozzle into the passage and the inner set of fingers to reduce the size of the gaps when the inner set of fingers of the first barrier is engaged with a refueling nozzle.

2. The filler neck of claim 1 which also includes a biasing member associated with the outer set of fingers and adapted to resist outward deflection of the outer set of fingers.

3. The filler neck of claim 2 wherein the biasing member is annular and has an inner diameter that is less than the outer diameter of a refueling nozzle plus the thickness of a finger of the inner set of fingers and plus the thickness of a finger of the outer set of fingers.

4. The filler neck of claim 1 wherein each gap is less than 0.7 mm in width when a refueling nozzle is inserted into the passage.

5. The filler neck of claim 1 wherein the fingers of the inner set of fingers include a first end coupled to the insert and a free end, and wherein a minimum diameter of the passage is defined between the fingers of the inner set of fingers.

6. The filler neck of claim 5 wherein the fingers of the outer set of fingers include a first end coupled to the insert and a free end, and wherein a radial gap is defined between the free ends of the inner and outer sets of fingers.

7. The filler neck of claim 5 wherein the fingers of the inner set of fingers are oriented at an angle so that the refueling nozzle engages only a portion of the axial length of the fingers.

8. The filler neck of claim 1 wherein the first barrier and second barrier are formed on the same piece of material.

9. The filler neck of claim 1 wherein the insert is formed from a single piece of material with the inner set of fingers and outer set of fingers on the same piece of material.

10. A filler neck for a fuel tank, comprising:
an outer tube attached to the fuel tank through which fuel is discharged into the fuel tank during a refueling event;
an insert carried by the outer tube and having a passage adapted to receive a refueling nozzle during a refueling event, a first barrier adapted to engage a refueling nozzle inserted in the passage and having one or more gaps through which fluid may flow between the refueling nozzle and first barrier, and a second barrier adapted to engage the first barrier to reduce the size of the gaps when the first barrier is engaged with a refueling nozzle;
wherein the first barrier includes an inner set of fingers with an elongate slot between the fingers in the inner set of fingers, and the second barrier includes an outer set of fingers located radially outwardly of the inner set of fingers and adapted to engage the inner set of fingers upon insertion of a refueling nozzle into the passage; and
wherein the fingers of the outer set of fingers include a radially inwardly extending projection adapted to be received in the slot between adjacent fingers of the inner set of fingers when a refueling nozzle is inserted into the passage.

11. An insert for a filler neck, comprising:
a main body having an outer wall;
an entrance portion defining at least part of a passage into which a refueling nozzle is inserted into the insert;
an inner set of elongate generally axially extending and resilient fingers carried by the main body, having a slot between adjacent fingers in the inner set of fingers and collectively defining part of said passage into which a refueling nozzle is inserted during a refueling event, said passage having a minimum diameter defined between the fingers of the inner set of fingers that is equal to or less than the outer diameter of a refueling nozzle; and
an outer set of elongate generally axially extending fingers carried by the main body and located radially outwardly of the inner set of fingers with an outer finger radially aligned with and overlapping at least a portion of each slot between adjacent fingers and adjacent portions of such adjacent fingers of the inner set of fingers, whereby upon insertion of a refueling nozzle into the passage the refueling nozzle engages the inner set of fingers and outwardly displaces at least a portion of the fingers into engagement with the outer set of fingers, and thereby decreases the area for fluid flow between the refueling nozzle and the insert.

12. The insert of claim 11 which also includes a biasing member associated with the outer set of fingers and adapted to resist outward deflection of the outer set of fingers.

13. The insert of claim 12 wherein the biasing member is annular and has an inner diameter that is less than the outer diameter of a refueling nozzle plus the thickness of a finger of the inner set of fingers and plus the thickness of a finger of the outer set of fingers.

14. The insert of claim 11 wherein each gap is less than 0.7 mm in width when a refueling nozzle is inserted into the passage and the fingers of the inner set of fingers engage the fingers of the outer set of fingers.

15. The insert of claim 11 wherein the fingers of the inner set of fingers include a first end coupled to the insert and a free end, and wherein the minimum diameter of the passage is defined between the fingers.

16. The insert of claim 15 wherein the fingers of the outer set of fingers include a first end coupled to the insert and a free end, and wherein a radial gap is defined between the free ends of the inner and outer sets of fingers.

17. The insert of claim 15 wherein the fingers of the inner set of fingers are oriented at an angle so that the refueling nozzle engages only a portion of the axial length of the fingers.

18. The filler neck of claim 11 wherein the insert is formed from a single piece of material with the inner set of fingers and outer set of fingers on the same piece of material.

19. An insert for a filler neck, comprising:
a main body having an outer wall;
an entrance portion defining at least part of a passage into which a refueling nozzle is inserted into the insert;
an inner set of fingers carried by the main body, having a slot between adjacent fingers in the inner set of fingers and collectively defining part of said passage into which a refueling nozzle is inserted during a refueling event, said passage having a minimum diameter defined between the fingers of the inner set of fingers that is equal to or less than the outer diameter of a refueling nozzle;
an outer set of fingers carried by the main body and located radially outwardly of the inner set of fingers with an outer finger radially aligned with each slot between adjacent fingers of the inner set of fingers, whereby upon insertion of a refueling nozzle into the passage the refueling nozzle engages the inner set of fingers and outwardly displaces at least a portion of the fingers into engagement with the outer set of fingers; and
wherein the fingers of the outer set of fingers include a radially inwardly extending projection adapted to be received in the slot between adjacent fingers of the inner set of fingers when a refueling nozzle is inserted into the passage, and between the fingers of the inner set of fingers.

\* \* \* \* \*